United States Patent [19]

Sugi et al.

[11] Patent Number: 5,716,895
[45] Date of Patent: Feb. 10, 1998

[54] PROCESS FOR REGENERATION OF CATALYSTS

[75] Inventors: Hideki Sugi, Gunma-ken; Kazuo Shiraishi; Atsushi Sudo, both of Annaka, all of Japan

[73] Assignee: Nippon Kayaku Kabushiki Kaisha, Tokyo, Japan

[21] Appl. No.: 867,283

[22] Filed: Jun. 2, 1997

Related U.S. Application Data

[63] Continuation of Ser. No. 343,482, Nov. 28, 1994, abandoned.

[30] Foreign Application Priority Data

Apr. 1, 1993 [JP] Japan ................... 5-096481

[51] Int. Cl.$^6$ .................. B01J 38/74; B01J 20/34
[52] U.S. Cl. .................. 502/24; 502/22; 502/27; 502/33
[58] Field of Search ............... 502/22, 27, 33, 502/24

[56] References Cited

U.S. PATENT DOCUMENTS 3,249,555  5/1966  Wentz et al. .................. 252/412
4,052,332  10/1977  D'Amore .................. 252/413

FOREIGN PATENT DOCUMENTS 2 589 368   5/1987  France.
2 666 591   3/1992  France.
53-113790   5/1978  Japan.
54-2293     1/1979  Japan.
56-163755   6/1981  Japan.
58-156351   4/1983  Japan.
60-232247   9/1985  Japan.
63-42738    3/1988  Japan.

OTHER PUBLICATIONS

Copy of the European Search Report dated Jun. 5, 1996.

*Primary Examiner*—Glenn Caldarola
*Assistant Examiner*—Alexander G. Ghyka
*Attorney, Agent, or Firm*—Nields, Lemack & Dingman

[57] ABSTRACT

A simple and excellent process for the regeneration of heteropolyacid catalysts can be provided. A heteropolyacid catalyst, e.g. a phosphomolybdic acid catalyst, whose activity has been lowered can be regenerated by dissolving and/or suspending it in an aqueous medium and then treating with an inorganic ion-exchange material, e.g. crystalline antimonic acid.

4 Claims, No Drawings

PROCESS FOR REGENERATION OF CATALYSTS

This application is a continuation of application Ser. No. 08/343,482 filed Nov. 28, 1994, now abandoned.

(TECHNICAL FIELD)

The present invention relates to a process for the regeneration of a heteropolyacid type catalyst whose activity has been lowered.

(BACKGROUND ART)

Generally, deactivation of catalysts may usually occur during their use, for example, sudden deactivation due to an abnormal reaction in the course of a desired reaction, slow deactivation due to physical and/or chemical changes thereof in a long term operation or deactivation due to moisture absorption during the storage thereof.

Heteropolyacids are used for hydrating reactions of propylene or isobutylene and gas-phase oxidizing reactions of olefins or aldehydes, as a catalyst having characteristic natures and excellent functions.

Among these heteropolyacids, several methods for the regeneration of catalysts used for gas-phase catalytic reactions of methacrolein have been proposed.

For example, the methods include a method comprising treating with ammonia and an aqueous hydrogen peroxide solution [Japanese Patent Application Laying Open (KOKAI) No. 53-113790 (1978)], a method comprising dissolving in ammonia or pyridine [Japanese Patent Application Laying Open (KOKAI) No. 60-232247 (1985)], a method comprising extracting a water soluble metal salt of heteropolyacid with an aqueous medium and heating with molecular oxygen [Japanese Patent Application Laying Open (KOKAI) No. 56-163755 (1981)] and a method comprising treating with steam [Japanese patent Application Laying open (KOKAI) No. 58-156351 (1983)]. Each of the methods is characterized by supplementing ammonia which has been volatilized during the use of catalysts or increasing the surface area of deteriorated catalysts by the steam treatment to recover their activity.

There are, however, some problems that although the initial activity and selectivity, for the reaction, of the catalysts regenerated by these methods are good their lifetimes are short, or although their lifetimes are long there is not enough recovery of their activities. Therefore, these methods are insufficient.

It is an object of the invention to provide a process for the regeneration of a heteropolyacid catalyst whose activity has been lowered to obtain a heteropolyacid catalyst with enough activity and a long lifetime.

(DISCLOSURE OF THE INVENTION)

The inventors have taken a great effort to solve and overcome the above-mentioned problems and drawbacks and thus accomplished the invention.

The invention relates to:

(1) A process for the regeneration of a heteropolyacid catalyst whose activity has been lowered, comprising dissolving and/or suspending the heteropolyacid catalyst in an aqueous medium and treating with an inorganic ion-exchange material;

(2) The process according to (1) set forth, wherein the heteropolyacid catalyst is a heteropolyacid catalyst comprising at least one selected from the group consisting of phosphomolybdic acid, phosphovanadomolybdic acid and a salt thereof, whose activity has been lowered by using it for a gas-phase catalytic oxidizing reaction;

(3) The process according to (1) or (2) set forth, in which the inorganic ion-exchange material is an inorganic ion-exchange material wherein its distribution coefficient to sodium ions is larger than that to potassium ions;

(4) The process according to (1), (2) or (3) set forth, wherein the inorganic ion-exchange material is an antimony compound; or (5) The process according to (1), (2), (3) or (4) set forth, wherein hydrogen peroxide is used when the heteropolyacid catalyst whose activity has been lowered is dissolved and/or suspended in the aqueous medium.

The heteropolyacid catalysts whose activities have been lowered, used in the invention include any compound having a heteropolyacid structure, independent of the way that it is deteriorated. For Example, the catalysts to be regenerated may include heteropolyacid catalysts whose activities are lowered by using hydrating reactions of olefins, e.g. propylene and isobutylene, or using gas-phase catalytic oxidizing reactions of olefins, e.g. isobutylene, aldehydes, e.g. methacrolein and isobutyraldehyde, or acids, e.g. isobutyric acid, and heteropolyacid catalysts whose activities are lowered by moisture absorption during their storage.

The heteropolyacid catalyst which can be used for the invention are not limited in their types and may include anyone based on a heteropolyacid. Examples of preferred heteropolyacid catalysts include heteropolyacid catalysts comprising at least one selected from the group consisting of phosphomolybdic acid, phosphovanadomolybdic acid and a salt thereof, e.g. heteropolyacid catalysts having the following formula:

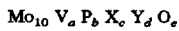

$$Mo_{10} V_a P_b X_c Y_d O_e$$

wherein Mo represents molybdenum, V represents vanadium; P represents phosphorus; X represents at least one element selected from the group consisting of alkali metals, alkaline earth metals and thallium; Y represents at least one element selected from the group consisting of transition metals, boron, germanium, arsenic, antimony and tin; O represents oxygen; a, b, c, d, or e represents the number of the atom of V, P, X, Y or O when the number of the atom of Mo is 10; a is a number of 0 to 3; b is a number of 0.8 to 5; c is a number of 0 to 3; d is a number of 0 to 3 and e is a number which can be necessarily determined depend upon the compositional ratio and oxidation state of each element.

Industrially, heteropolyacid catalysts have been generally used in molded forms. When heteropolyacid acids are molded, carriers and/or molding aids may be used. The carriers may include silicon carbide, alumina and silica-alumina and the molding aids may include diatomaceous earth, ceramic fibers, whisker and carbon fibers.

The heteropolyacid catalysts used in the invention may be molded using these carriers and/or molding aids and the process for the regeneration according to the invention is very useful for such molded catalysts as well.

The decrease of catalyst activity may be caused by, for example, the volatilization of ammonia contained in the catalyst, the change or destruction of catalyst structure due to heat, or the pollution of catalyst surface with starting materials and/or reaction products when the catalyst is used for the gas-phase catalytic oxidizing reaction as set forth. We have found that when a molded heteropolyacid catalyst is used, in addition to the above, the decrease of catalyst activity is caused by alkali metals, such as sodium and potassium, contained in carriers and/or molding aids used to mold the catalyst because these metals have a bad effect on the catalyst during the use thereof for a lengthened period of reaction. In such instance, sodium acts much more badly than potassium.

The inventors have also found that the molded heteropolyacid catalyst whose activity is lowered during the reaction due to the bad effect of the alkali metals contained in the carriers and/or molding aids used for the molding of catalyst can be easily and sufficiently regenerated by the process of the invention.

According to the invention, after being optionally baked, for example, at a temperature of 200° to 500° C. for 1 to 100 hours, the catalyst whose activity has been lowered is dissolved and/or suspended in an aqueous medium. The aqueous media may include water and water containing hydrophilic organic solvents. The hydrophilic organic solvents may include alcohols, e.g. methanol and ethanol, and ketones, e.g. acetone and methyl ethyl ketone. When the aqueous medium contains the hydrophilic organic solvents in addition to water, the content of the solvents may be preferably at most 50% by weight based on the aqueous medium.

The amount of the aqueous medium used may be at least the same as that of the heteropolyacid catalyst to be regenerated in weight. the aqueous medium used is preferably 4 to 20 times the weight of the heteropolyacid catalyst to be regenerated.

The aqueous medium wherein the heteropolyacid catalyst is dissolved and/or suspended is preferably made to be in oxidation state, and then, if necessary, centrifuged to remove the undissolved components, e.g. the carriers and/or molding aids, followed by the treatment with an inorganic ion-exchange material. In order to make the oxidation state, for example, an aqueous hydrogen peroxide is added. The amount of aqueous hydrogen peroxide is preferably 1 to 20% by weight based on the heteropolyacid catalyst used.

The treatment with an inorganic ion-exchange material may be carried out by, for example, adding the material and mixing but is not limited thereto. The temperatures of the treatment are usually 10° to 95° C. but are not limited thereto. The periods required for the treatment are usually 30 minutes to 100 hours but not limited thereto.

The amount of the inorganic ion-exchange material used may be preferably 1 to 20% by weight, especially 2 to 10% by weight, based on the heteropolyacid catalyst used. The inorganic ion-exchange material may include any one wherein its distribution coefficient to sodium ions is larger than that to potassium ions, for example, an antimonic acid.

Preferred examples of the inorganic ion-exchange materials are especially antimony compounds. Of these compounds, antimonic acid, e.g. crystalline antimonic acid, is preferred. When the antimony compound is used as inorganic ion-exchange material, superior results are obtained because the catalyst can be regenerated without separating the catalyst components from the inorganic ion-exchange material after the treatment. In order to thoroughly remove calcium and potassium ions which contained in the carrier and the like, an additional step comprising treating with an ion-exchange resin may be carried out after the treatment with the inorganic ion-exchange material.

The regenerated catalyst can be obtained by optionally centrifuging the solution treated with inorganic ion-exchange material to remove it and then evaporating the solution to dryness. The regenerated catalyst thus obtained may be used after the optional carrying thereof on a carrier or the molding in the usual way, and the heat treatment thereof at a temperature of 100° to 500° C. For example, there is a method wherein a mixture comprising the regenerated catalyst powder and a little amount of water is carried on the carrier as exemplified above using a rolling granulator or a mixture comprising the regenerated catalyst powder, a little amount of water and a molding aid as illustrated above is kneaded and then pressed into tablets or extrusion molded.

The carrier may be used in such an amount that the amount of catalyst is 10 to 70% by weight based on the total amount of catalyst and carrier, and the molding aid may be used in such an amount that the amount of catalyst is 1 to 10% by weight based on the total amount of catalyst and molding aid.

According to the process of the invention, a heteropolyacid catalyst whose activity has been lowered can be simply regenerated and the regenerated catalyst thus obtained has high activity and a long term lifetime. When the activity of the regenerated catalyst is lowered, the catalyst can be repeatedly regenerated by the process of the invention.

(EXAMPLES)

Hereinafter, the present invention will be illustratively explained with Examples but is not limited thereto. The part described in Examples represents a part by weight. The compositional ratio of O (oxygen atom) in each catalyst composition of Examples is simply represented by $O_x$ without any explanation because it can necessarily determined depend on the compositional ratio and oxidation state of each element as described hereinbefore.

Example 1

(Preparation of Catalyst-A)

Particles of a heteropolyacid catalyst having the following formula:

$Mo_{10} V_{1.0} P_{1.0} Cu_{0.3} Ge_{0.2} O_x$ were prepared by the same manner as described in the example 3 of Japanese Patent Application Laying Open (KOKAI) No. 54-66619 (1979) from 1440 parts of molybdenum trioxide, 90.95 parts of vanadium pentaoxide, 115.29 parts of 85% orthophosphoric acid, 23.97 parts of cupric oxide and 20.92 parts of germanium oxide.

A powder mixture comprising 45 parts of the above particles and 5 parts of diatomaceous earth was carried on 50 parts of alumina ball carrier using 20% of water, as binder, based on the weight of the particles with a rolling granulator. The resultant was baked at 300° C. for 10 hours to obtain a fresh catalyst-A.

After the fresh catalyst is used for the methacrolein-oxidizing reaction for 16000 hours, the deteriorated catalyst-A was recovered. One hundred parts of the deteriorated catalyst above was added to 450 parts of pure water in a beaker to dissolve the catalyst components therein. An aqueous hydrogen peroxide was then added to the solution until it became a reddish orange color. The solution was filtered through a filter paper to obtain a filtrate. To the filtrate was added 5% by weight of crystalline antimonic acid based on the deteriorated catalyst and the resultant was agitated at 85° C. for 15 hours followed by the further filtration. The filtrate was evaporated to dryness to obtain regenerated catalyst particles. A mixture comprising 45 parts of the regenerated catalyst particles and 5 parts of diatomaceous earth was carried on 50 parts of the carrier in the same manner as described above to obtain a catalyst (which was hereinafter referred to as inorganic, regenerated catalyst).

The inorganic, regenerated catalyst was filled into a reaction tube with an inner diameter of 18.4 mm and a mixed gas consisting of methacrolein:oxygen:water:nitrogen= 1:2:4:18.6 (in molar ratio) was supplied thereinto and reacted at 295° C. for a contact period of 3.0 seconds. Results are shown in Table 1.

A catalyst was also prepared by the same manner as described above except that no crystalline antimonic acid was added, and it is hereinafter referred to as untreated, regenerated catalyst. Results of the activity measuring test under the same conditions, as described above, using the untreated, regenerated catalyst and using the deteriorated catalyst are also shown in Table 1. In Tables 1 to 6, the conversion rate of methacrolein, the conversion rate of isobutyraldehyde and the selectivity of methacrylic acid can be calculated using the following equations (I) to (III):

Equation (I) A=(RM/SM)×100 (for Tables 1 to 4 and 6);

Equation (II) B=(RI/SI)×100 (for Table 5); and

Equation (III) C=(PM/RM)×100 (for Tables 1 to 4 and 6) or C=(PM/RI)×100 (for Table 5)

wherein A represents the conversion rate of methacrolein (%), B represents the conversion rate of isobutyraldehyde (%), C represents the selectivity of methacrylic acid (%), RM represents the molar number of reacted methacrolein, SM represents the molar number of supplied methacrolein, RI represents the molar number of reacted isobutyraldehyde, SI represents the molar number of supplied isobutyraldehyde, and PM represents the molar number of formed methacrylic acid.

TABLE 1

| Catalyst | Conversion Rate of Methacrolein (%) | Selectivity of Methacrylic acid (%) |
|---|---|---|
| Fresh Catalyst | 85.0 | 82.1 |
| Deteriorated Catalyst | 65.0 | 85.0 |
| Untreated, Regenerated Catalyst | 52.0 | 87.0 |
| Inorganic, Regenerated Catalyst | 88.0 | 80.7 |

Example 2

(Preparation of Catalyst-B)

Particles of a heteropolyacid catalyst having the following formula:

$Mo_{10} V_{1.0} P_{1.0} Cu_{0.2} Ge_{0.2} K_{0.2} O_x$ were prepared by the same manner as described in Example 1 from 1440 parts of molybdenum trioxide, 90.95 parts of vanadium pentaoxide, 115.29 parts of 85% orthophosphoric acid, 15.91 parts of cupric oxide, 20.92 parts of germanium oxide and 11.22 parts of potassium hydroxide.

A powder mixture comprising 45 parts of the above particles and 5 parts of diatomaceous earth was carried on 50 parts of the carrier in the same manner as described in Example 1. The resultant was baked at 300° C. for 10 hours to obtain a fresh catalyst-B.

The fresh catalyst-B was intentionally deteriorated by using it for the methacrolein-oxidizing reaction at a reaction temperature of 390° C. for 50 hours. One hundred parts of the deteriorated catalyst above was added to 450 parts of pure water in a beaker to dissolve the catalyst components therein. An aqueous hydrogen peroxide was then added to the solution until it became a reddish orange color. The solution was filtered through a 12 mesh screen to remove the carrier and then a suspension was obtained. To the suspension was added 5% by weight of crystalline antimonic acid based on the deteriorated catalyst and the resultant was agitated at 35° C. for 15 hours. The treated liquid was evaporated to dryness to obtain regenerated catalyst particles. 50 parts of the regenerated catalyst particles was carried on 50 parts of the carrier in the same manner as described in Example 1 to obtain a catalyst (which was hereinafter referred to as inorganic, regenerated catalyst).

Methacrolein was oxidized using the inorganic, regenerated catalyst in the same way as described in Example 1 except that the reaction temperature was 300° C. Results are shown in Table 2.

Results obtained from the activity measuring tests under the same conditions as described above using a catalyst prepared in the same manner as described above except that no crystalline antimonic acid was added (said catalyst being hereinafter referred to as untreated, regenerated catalyst) and using the deteriorated catalyst are also shown in Table 2.

TABLE 2

| Catalyst | Conversion Rate of Methacrolein (%) | Selectivity of Methacrylic acid (%) |
|---|---|---|
| Fresh Catalyst | 81.0 | 81.1 |
| Deteriorated Catalyst | 67.5 | 85.5 |
| Untreated, Regenerated Catalyst | 62.0 | 87.2 |
| Inorganic, Regenerated Catalyst | 80.3 | 81.3 |

Example 3

(Preparation of Catalyst-C)

Particles of a heteropolyacid catalyst having the following formula:

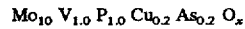

$Mo_{10} V_{1.0} P_{1.0} Cu_{0.2} As_{0.2} O_x$ were prepared by the same manner as described in Example 1 from 1440 parts of molybdenum trioxide, 90.95 parts of vanadium pentaoxide, 115.29 parts of 85% orthophosphoric acid, 15.91 parts of cupric oxide, and 47.31 parts of 60% arsenic acid aqueous solution.

A powder mixture comprising 45 parts of the above particles and 5 parts of diatomaceous earth was carried on 50 parts of the carrier by the same manner as described in Example 1. The resultant was baked at 300° C. for 10 hours to obtain a fresh catalyst-C.

The fresh catalyst-C was intentionally deteriorated by using it for the methacrolein-oxidizing reaction at a reaction temperature of 390° C. for 50 hours. One hundred parts of the deteriorated catalyst above was added to 450 parts of pure water in a beaker to dissolve the catalyst components therein. An aqueous hydrogen peroxide was then added to the solution until it became a reddish orange color. The solution was filtered through a filter paper to obtain a filtrate. To the filtrate was added 5% by weight of crystalline antimonic acid based on the deteriorated catalyst and the resultant was agitated at 35° C. for 3 hours followed by the further filtration. The filtrate thus obtained was evaporated to dryness to obtain regenerated catalyst particles. A mixture comprising 45 parts of the regenerated catalyst particles and 5 parts of diatomaceous earth was carried on 50 parts of the carrier by the same manner as described in Example 1 to obtain a catalyst (which was hereinafter referred to as inorganic, regenerated catalyst).

Methacrolein was oxidized using the inorganic, regenerated catalyst under the same conditions as described in Example 1 except that the reaction temperature was 310° C. Results are shown in Table 3.

Results obtained from the activity measuring tests under the same conditions as described above using a catalyst prepared by the same manner as described above except that no crystalline antimonic acid was added (said catalyst being hereinafter referred to as untreated, regenerated catalyst) and using the deteriorated catalyst are also shown in Table 3.

TABLE 3

| Catalyst | Conversion Rate of Methacrolein (%) | Selectivity of Methacrylic acid (%) |
|---|---|---|
| Fresh Catalyst | 84.5 | 83.3 |
| Deteriorated Catalyst | 75.0 | 85.6 |
| Untreated, Regenerated Catalyst | 50.9 | 86.7 |
| Inorganic, Regenerated Catalyst | 86.4 | 82.6 |

Example 4

(Preparation of Catalyst-D)

Particles of a heteropolyacid catalyst having the following formula:

$$Mo_{10} V_{1.0} P_{1.0} Cu_{0.2} Ge_{0.2} O_x$$

were prepared by the same manner as described in the preparation of the catalyst-A except that 1765.51 parts of ammonium molybdate was used instead of molybdenum oxide and 116.99 parts of ammonium metavanadate instead of vanadium pentaoxide.

A powder mixture comprising 45 parts of the above particles and 5 parts of diatomaceous earth was carried on 50 parts of the carrier by the same manner as described in Example 1. The resultant was baked at 380° C. for 5 hours to obtain a fresh catalyst-D.

The fresh catalyst-D was intentionally deteriorated by using it for the methacrolein-oxidizing reaction at a reaction temperature of 390° C. for 50 hours. One hundred parts of the deteriorated catalyst above was added to 450 parts of pure water in a beaker and the components of the catalyst were dissolved therein. An aqueous hydrogen peroxide was then added to the solution until it became a reddish orange color. The solution was filtered through a filter paper to obtain a filtrate. To the filtrate was added 5% by weight of crystalline antimonic acid based on the deteriorated catalyst and the resultant was agitated at 35° C. for 3 hours followed by the further filtration. An aqueous ammonia solution was added to the filtrate to pH 5.3 and the filtrate was then evaporated to dryness to obtain regenerated catalyst particles. A mixture comprising 45 parts of the regenerated catalyst particles and 5 parts of diatomaceous earth was carried on 50 parts of the carrier by the same manner as described in Example 1 to obtain a catalyst (hereinafter referred to as inorganic, regenerated catalyst).

Methacrolein was oxidized using the inorganic, regenerated catalyst-D under the same conditions as described in Example 1 except that the reaction temperature was 310° C. Results are shown in Table 4.

Results obtained from the activity measuring tests under the same conditions as described above using a catalyst which was prepared by the same manner as described above except that no crystalline antimonic acid was added (said catalyst being hereinafter referred to as untreated, regenerated catalyst) or using the deteriorated catalyst are also shown in Table 4.

TABLE 4

| Catalyst | Conversion Rate of Methacrolein (%) | Selectivity of Methacrylic acid (%) |
|---|---|---|
| Fresh Catalyst | 78.9 | 80.2 |
| Deteriorated Catalyst | 65.2 | 81.3 |
| Untreated, Regenerated Catalyst | 72.6 | 80.7 |
| Inorganic, Regenerated Catalyst | 82.9 | 81.4 |

Example 5

The fresh catalyst-A was intentionally deteriorated by using it for the isobutyraldehyde-oxidizing reaction at a reaction temperature of 390° C. for 50 hours. One hundred parts of the deteriorated catalyst above was added to 450 parts of pure water in a beaker and the components of the catalyst were dissolved therein. An aqueous hydrogen peroxide was then added to the solution until it became a reddish orange color. The solution was filtered through a filter paper to obtain a filtrate. To the filtrate was added 5% by weight of crystalline antimonic acid based on the deteriorated catalyst and the resultant was agitated at 35° C. for 3 hours followed by the further filtration. The filtrate thus obtained was evaporated to dryness to obtain regenerated catalyst particles. A mixture comprising 45 parts of the regenerated catalyst particles and 5 parts of diatomaceous earth was carried on 50 parts of the carrier by the same manner as described in Example 1 to obtain a catalyst (hereinafter referred to as inorganic, regenerated catalyst).

The inorganic, regenerated catalyst was filled into a reaction tube with an inner diameter of 18.4 mm and a mixed gas consisting of isobutyraldehyde:oxygen:water:nitrogen= 1:2:4:18.6 (in molar ratio) was supplied thereinto and reacted at a reaction temperature of 295° C. for a contact period of 3.0 seconds. Results are shown in Table 5.

Results obtained from the activity measuring tests under the same conditions as described above using a catalyst prepared by the same manner as described above except that no crystalline antimonic acid was added (said catalyst being hereinafter referred to as untreated, regenerated catalyst) and using the deteriorated catalyst are also shown in Table 5.

TABLE 5

| Catalyst | Conversion Rate of isobutyraldehyde (%) | Selectivity of Methacrylic acid (%) |
|---|---|---|
| Fresh Catalyst | 92.3 | 82.2 |
| Deteriorated Catalyst | 85.3 | 84.6 |
| Untreated, Regenerated Catalyst | 58.6 | 88.3 |
| Inorganic, Regenerated Catalyst | 91.7 | 82.3 |

Example 6

The lifetime of each of the fresh catalyst-A, untreated, regenerated catalyst and inorganic, regenerated catalyst as described in Example 1 was measured by the following accelerated test.

A thorough mixture consisting of 10 ml of the catalyst and 10 ml of inactive alumina balls was filled into a reaction tube with an inner diameter of 17.5 mm and a mixed gas consisting of methacrolein:oxygen:water:nitrogen= 1:2:4:18.6 (in molar ratio) was supplied thereinto and reacted at a reaction temperature of 360° C. for a contact period of 1.46 seconds. Results are shown in Table 6.

TABLE 6

| Catalyst | Reaction Period (Day) | Conversion Rate of Methacrolein (%) | Selectivity of Methacrylic acid (%) |
|---|---|---|---|
| Fresh | 3 | 72.1 | 78.3 |
| Catalyst | 30 | 70.6 | 82.7 |
| Untreated, | 3 | 46.0 | 83.3 |
| Regenerated Catalyst | 15 | 32.5 | 82.4 |
| Inorganic, regenerated | 3 | 75.4 | 78.2 |
| Catalyst | 30 | 71.8 | 83.1 |

Example 7

A hydrogen peroxide untreated regenerated catalyst was prepared by treating the deteriorated catalyst in the same manner as described in Example 1 except that no hydrogen peroxide was used. The activity of the hydrogen peroxide untreated regenerated catalyst was measured by the test under the same conditions as described in Example 1. As a result, the conversion rate of methacrolein was 80.3% and the selectivity of methacrylic acid was 79.5%.

Example 8

A hydrogen peroxide untreated regenerated catalyst was prepared by treating the deteriorated catalyst in the same manner as described in Example 2 except that no hydrogen peroxide was used. The activity of the hydrogen peroxide untreated regenerated catalyst was measured by the test under the same conditions as described in Example 2. As a result, the conversion rate of methacrolein was 78.8% and the selectivity of methacrylic acid was 79.7%.

Example 9

A hydrogen peroxide untreated regenerated catalyst was prepared by treating the deteriorated catalyst in the same manner as described in Example 3 except that no hydrogen peroxide was used. The activity of the hydrogen peroxide untreated regenerated catalyst was measured by the test under the same conditions as described in Example 3. As a result, the conversion rate of methacrolein was 82.3% and the selectivity of methacrylic acid was 81.3%.

Example 10

A hydrogen peroxide untreated regenerated catalyst was prepared by treating the deteriorated catalyst in the same manner as described in Example 4 except that no hydrogen peroxide was used. The activity of the hydrogen peroxide untreated regenerated catalyst was measured by the test under the same conditions as described in Example 4. As a result, the conversion rate of methacrolein was 80.1% and the selectivity of methacrylic acid was 80.0%.

According to the invention, a catalyst with high activity and a long lifetime can be regenerated from a heteropolyacid catalyst whose activity has been lowered.

We claim:

1. A process for the regeneration of a heteropolyacid catalyst whose activity has been lowered, comprising dissolving and/or suspending the heteropolyacid catalyst in an aqueous medium and contacting with a solid, inorganic ion-exchange material which comprises an antimony compound and whose distribution coefficient to sodium ions is larger than that to potassium ions.

2. The process according to claim 1, wherein the heteropolyacid catalyst is a heteropolyacid catalyst whose activity has been lowered by the use for a gas-phase catalytic oxidizing reaction, comprising at least one selected from the group consisting of phosphomolybdic acid, phosphovanadomolybdic acid and a salt thereof.

3. The process according to claim 1, wherein hydrogen peroxide is used when the heteropolyacid catalyst whose activity has been lowered is dissolved and/or suspended in an aqueous medium.

4. The process according to claim 1, wherein hydrogen peroxide is used when the heteropolyacid catalyst whose activity has been lowered is dissolved and/or suspended in an aqueous medium.

* * * * *